(12) United States Patent
Baumgartl et al.

(10) Patent No.: US 6,290,386 B1
(45) Date of Patent: Sep. 18, 2001

(54) MOBILE DEVICE FOR PREPARING AQUEOUS LIQUID PAINTS FROM POWDERY COMPONENTS AND WATER

(75) Inventors: Horst Baumgartl, Kirchdorf (DE); Detlev Berner, Saline, MI (US)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/402,383

(22) PCT Filed: Apr. 2, 1998

(86) PCT No.: PCT/EP98/01912

§ 371 Date: Oct. 4, 1999

§ 102(e) Date: Oct. 4, 1999

(87) PCT Pub. No.: WO98/45033

PCT Pub. Date: Oct. 15, 1998

(30) Foreign Application Priority Data

Apr. 7, 1997 (DE) .............................................. 197 14 264

(51) Int. Cl.[7] .................................. B01F 5/04; B01F 7/26
(52) U.S. Cl. ........................................ 366/160.1; 366/155.1; 366/155.2; 366/162.2; 366/168.1; 366/181.1; 366/261; 366/316; 366/605; 366/167.1; 366/172.1; 366/172.2; 366/317
(58) Field of Search ................................ 366/155.1, 155.2, 366/160.1, 160.5, 162.2, 168.1, 181.1, 181.2, 181.3, 261, 316, 605, 167.1, 172.1, 172.2, 178.1, 178.2, 285, 286, 317

(56) References Cited

U.S. PATENT DOCUMENTS

| | | | |
|---|---|---|---|
| 348,931 | * | 9/1886 | Ross . |
| 1,592,788 | * | 7/1926 | Supervielle . |
| 2,387,488 | * | 10/1945 | Acken et al. . |
| 3,068,186 | * | 12/1962 | Paulus et al. . |
| 3,804,303 | * | 4/1974 | Fassauer . |
| 3,995,839 | * | 12/1976 | Zingg . |
| 3,998,433 | | 12/1976 | Iwako . |
| 4,086,663 | * | 4/1978 | Croft . |
| 4,099,005 | | 7/1978 | Fullington et al. . |
| 4,235,563 | | 11/1980 | Hine et al. . |
| 4,531,673 | * | 7/1985 | Holland et al. . |
| 4,813,787 | | 3/1989 | Conn . |
| 4,846,582 | * | 7/1989 | Davidsson . |
| 4,913,554 | * | 4/1990 | Bragg et al. . |
| 5,222,807 | * | 6/1993 | Gaddis . |
| 5,356,214 | * | 10/1994 | Styles . |
| 5,660,466 | * | 8/1997 | Hopson et al. . |

FOREIGN PATENT DOCUMENTS

| | | |
|---|---|---|
| 3 930 337 | 3/1991 | (DE) . |
| 2 535 643 | 5/1984 | (FR) . |

OTHER PUBLICATIONS

Derwent Abstract corr. to DE 3930337 A (AN 91–081479).
Derwent Abstract corr. to FR 2535643 A (AN 84–069254).

* cited by examiner

Primary Examiner—W. L. Walker
Assistant Examiner—David Sorkin
(74) Attorney, Agent, or Firm—Brooks & Kushman P.C

(57) ABSTRACT

The present invention relates to a mobile apparatus for the production of water based liquid paints from pulverulent constituents and water. The apparatus comprises a traveling frame, a mixing container, a mixing unit for mixing the pulverulent constituents and water, a metering unit for metering the pulverulent constituents into the mixing container, and a switching unit for controlling the metering and the mixing. The dissolver comprises a shaft and a dissolver disc having a ratio d/D of the diameter d of the dissolver disc to the diameter D of the mixing container of about 0.3 to 0.5, with the shaft being dimensioned so that during the mixing operation, the dissolver disc can be lowered to a distance b from the bottom of the mixing container of about 0.3 d to about 0.7 d.

11 Claims, 3 Drawing Sheets

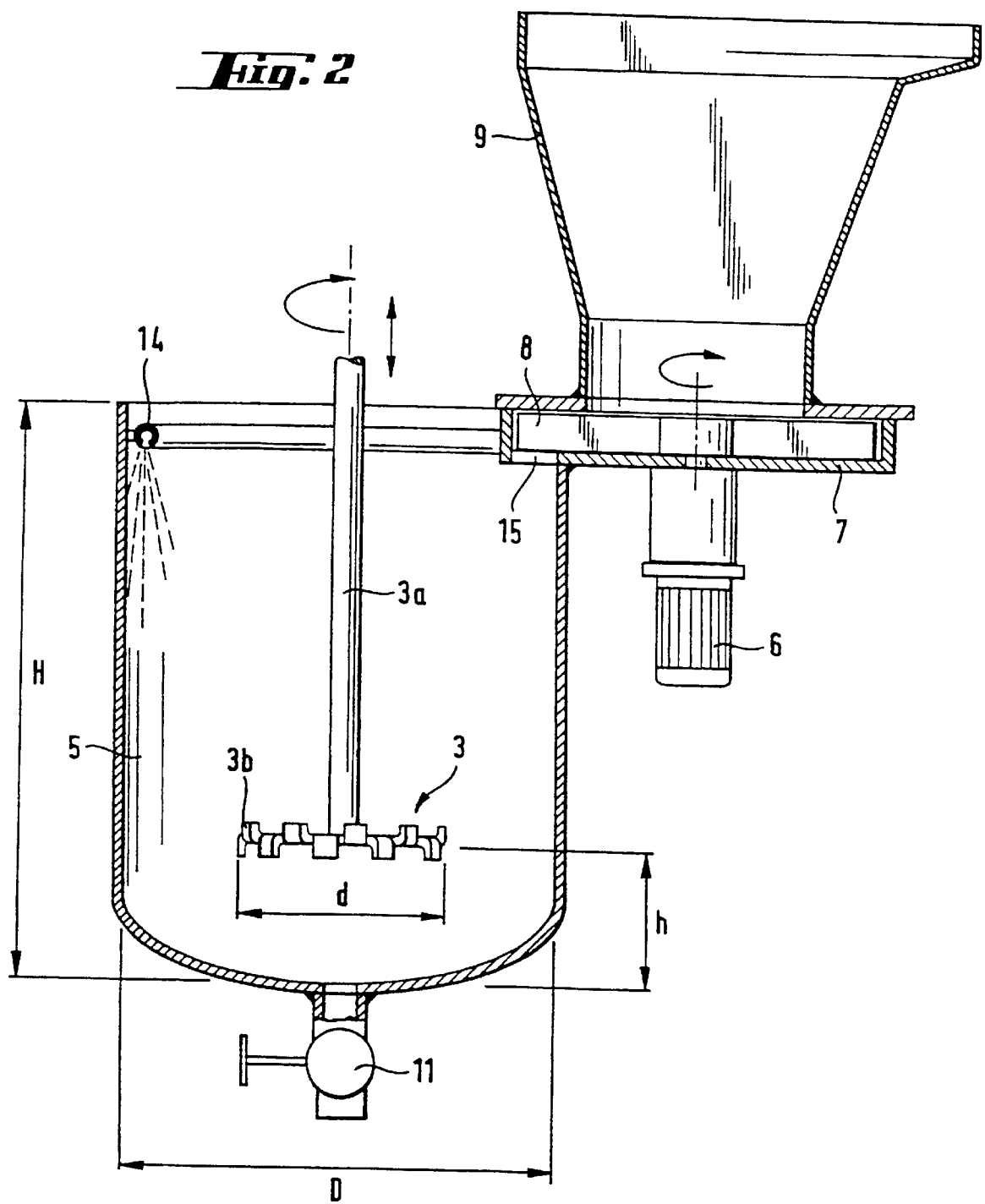

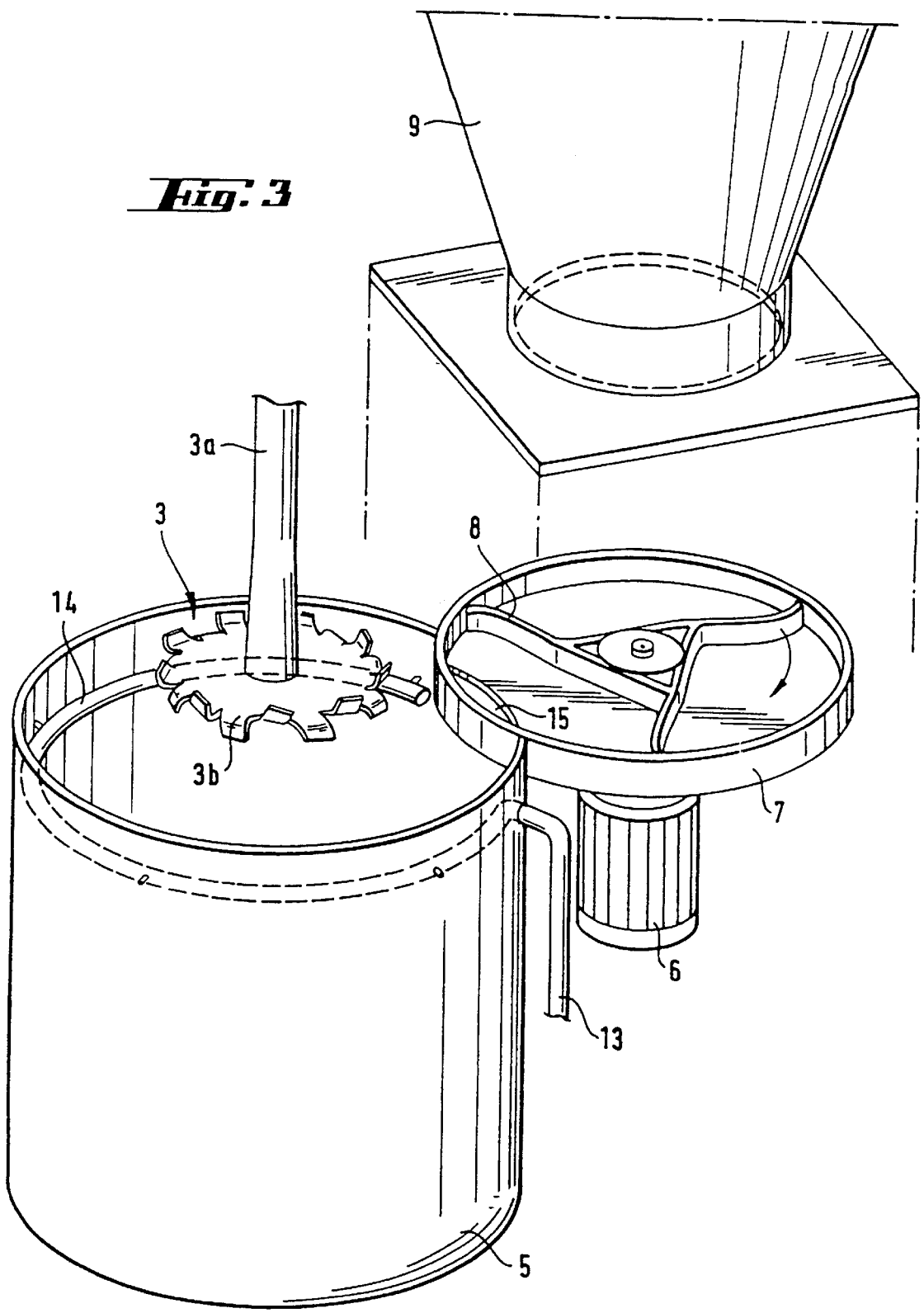

MOBILE DEVICE FOR PREPARING AQUEOUS LIQUID PAINTS FROM POWDERY COMPONENTS AND WATER

BACKGROUND OF THE INVENTION

The invention relates to a mobile appliance for the production of water-based liquid paints from pulverulent constituents and water, in particular on the foundation of dispersion powders, and to a method for the production of water-based liquid paints by means of the dispersal of dispersion powder compositions in water, using this appliance.

SUMMARY OF THE INVENTION

Water-based liquid paints, particularly dispersion paints, are produced by the paint manufacturers at the factory in large-size-dissolvers. The dissolvers are high-speed agitators with toothed discs which give rise to an outstanding dispersing effect as a result of the high circumferential speed at the toothed ring. In the factory production of dispersion paints, first water, if appropriate in mixture with secondary constituents, such as wetting agents, anti-foaming agents and preservatives, is administered in the dissolver and, with the agitator running at high speed, pigments and fillers are slowly introduced. After the dispersing operation has ended, the pigment paste thus obtained is intermixed with a plastic dispersion as binder, with the agitator running at slow speed. The finished paint is delivered in cans which have a water fraction in the dispersion paint of 30 to 50%.

For the production of dispersion paints, plastic powders (dispersion powders) redispersible in water may also be employed. Dispersion powders are plastic powders which can be stirred into water to form a stable aqueous plastic dispersion. With the development of plastic powders redispersible in water, such as the VinnapaS® dispersion powders of Wacker-Chemie, there is now the possibility of avoiding transporting the large water fraction in the dispersion paint and of mixing the dispersion paint directly at -the processing point by means of a powder mixture and water. The procedure hitherto in this case has been to stir the dispersion powder or the powder composition containing the dispersion powder into the mixing water on the spot by means of a wooden stirrer or a drilling machine equipped with an agitator. As a rule, this procedure does not achieve the same quality as in the case of a liquid dispersion paint produced at the factory in permanently installed dissolvers. The reason for this is that the shearing forces necessary for the good dispersing effect cannot be achieved in this procedure.

The object was, therefore, to develop a mobile, easy-to-handle appliance, by means of which it is possible to produce from pulverulent constituents on the spot, for example for use on a building site, a liquid paint having a quality which corresponds to that of dispersion paints produced at the factory.

The subject of the invention is a mobile appliance for the production of water-based liquid paints from pulverulent constituents and water, comprising a travelling frame 1 with a) a mixing unit which consists of a mixing motor 2 and of the dissolver 3 and which can be lowered into the mixing container 5 via a spring 4, and b) a metering unit with a metering motor 6, with the metering container 7 having a conveying element 8 and with the filling funnel 9, and c) a switching unit 10 with control elements for controlling the metering operation and the mixing operation.

BRIEF DESCRIPTION OF THE DRAWINGS

FIG. 2 is a sectional view of parts of the apparatus of the present invention; and FIG. 3 is an enlarged view of some of the parts shown in FIG. 1.

Figure 1:
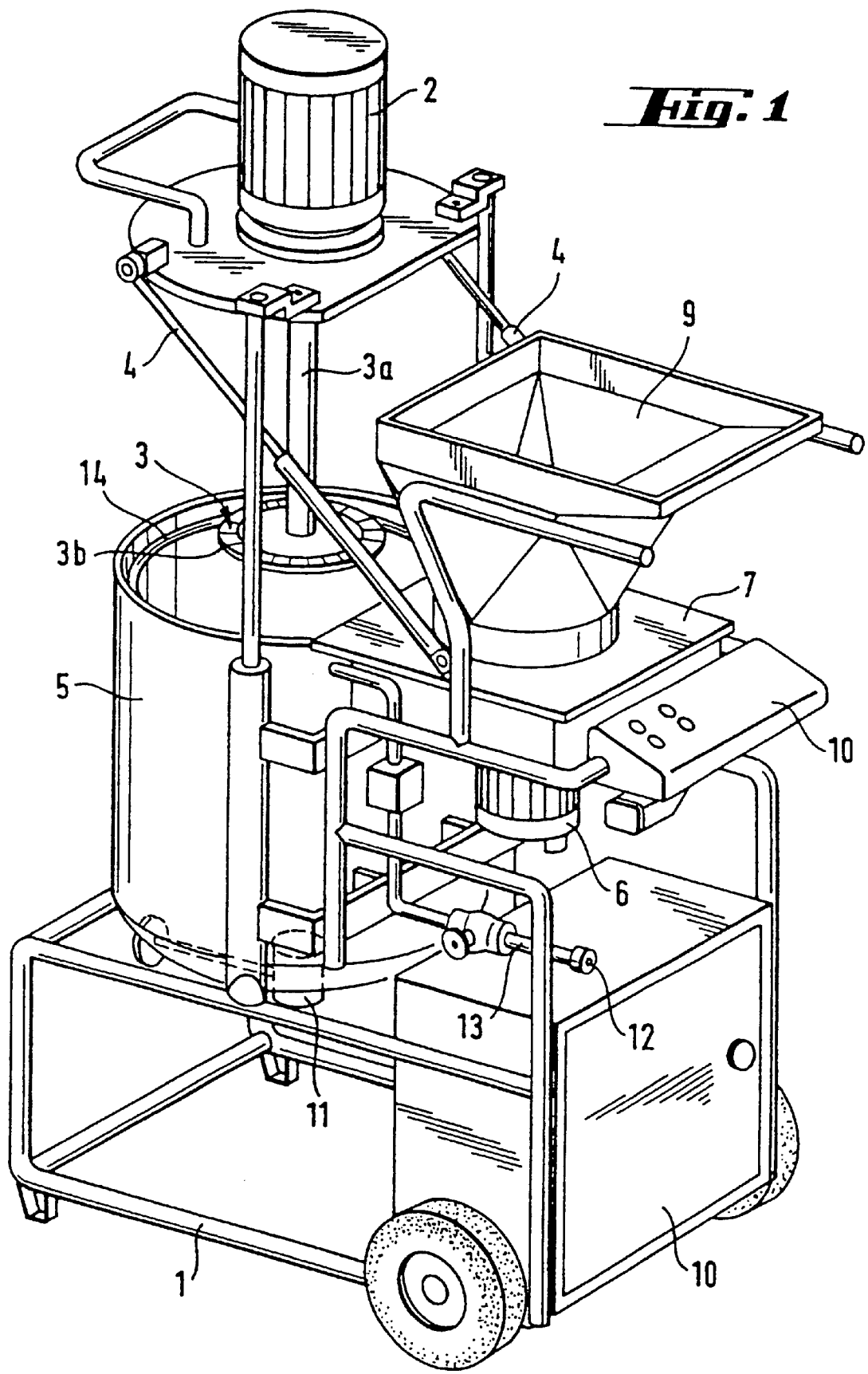
FIG. 1 is a perspective view of the apparatus of the present invention.

The appliance is explained in more detail below with reference to drawings. The drawings show diagrammatic illustrations of a preferred exemplary embodiment.

DETAILED DESCRIPTION OF THE PREFERRED EMBODIMENTS

The mobile appliance according to FIG. 1 comprises a travelling frame 1, for example a metal stand provided with lockable rollers. The mixing motor 2 for driving the dissolver 3 is arranged at the upper end of the frame. The dissolver 3 comprises an exchangeable shaft 3a and a dissolver disc 3b. The mixing unit consisting of the mixing motor 2 and of the dissolver 3 can be moved vertically by means of a spring 4, preferably a pneumatic compression spring.

The mixing container 5 is a conventionally cylindrical container, if appropriate with a rounded bottom, which is preferably manufactured from metal, for example high-grade steel. The diameter D of the mixing container 5 is preferably 200 mm to 400 mm. The ratio H/D of the height H of the mixing container to the diameter D is preferably 1:1 to 2:1. In order to extract the finished dispersion paint, the mixing container 5 is equipped with an extraction valve 11, preferably at the bottom of the container. In a preferred embodiment, the mixing container is equipped with a sensor for indicating the filling level.

An embodiment, in which the appliance is equipped with a connection 12 for the supply of water, is also preferred. A permanently installed conduit 13 leads from the water connection to the mixing container 5. Most preferred is an embodiment in which the mixing container 5 is equipped with a ring conduit 14 which is fed by the permanently installed conduit 13 and on the underside of which are located holes for the outflow of water into the mixing container 5. The ring conduit is arranged as high as possible in the mixing container, preferably just below the metering container 7.

The dissolver 3 comprises a shaft 3a, arranged vertically downwards and centrically in relation to the mixing container 5, and a dissolver disc 3b. The dissolver disc 3b is conventionally a steel disc which is equipped with teeth. A preferred shape of the dissolver disc 3b may be seen from the illustrations in FIG. 2 and FIG. 3.

The dispersing capacity is determined essentially by the dimensioning of the shaft 3a and of the dissolver disc 3b. FIG. 2 illustrates a preferred embodiment, The ratio d/D of the diameter d of the dissolver disc 3b to the diameter D of the mixing container 5 is preferably 0.3 to 0.5. The shaft 3a is preferably dimensioned in such a way that, during the mixing operation, the dissolver disc 3b can be lowered to a distance h from the bottom of the mixing container 5 of 0.3 d to 0.7 d, d standing for the diameter of the dissolver disc 3b.

Another element of the appliance according to the invention is the metering unit for metering the pulverulent constituents. The metering unit is explained in more detail in FIG. 3 and comprises a cylindrical metering container 7 which is open at the top and which is equipped with a conveying element 8 for apportioning the powder into the mixing container 5. A suitable conveying element 8 is, for example, a rotor disc with strippers arranged in the form of a star. The metering container 7 is mounted on the upper edge of the mixing container 5 or in a clearance at the upper edge of the mixing container 5, in such a way that the metering container projects into the mixing container 5. The bottom of the metering container 7 has, in the region projecting into the mixing container 5, an orifice 15, via which the powder material is conveyed into the mixing container 5.

For filling the metering container 7, the latter is equipped with a filling funnel 9. In a preferred embodiment, the filling funnel 9 can be closed by means of a lid. The lid is preferably designed in such a way that it can serve, in the opened state, as a supporting surface for the powder material which is normally packed into bags. The dimensioning of the filling funnel 9 is adapted to that of the mixing container 5 and is selected in such a way that the filling funnel 9 can receive in one batch the powder fraction of the paint quantity which can be mixed in the mixing container 5.

The conveying element 8 is driven by means of the metering motor 6 which is arranged below the metering container 7.

To control the conveying speed, control the agitating speed during the mixing operation and, if appropriate, control the supply of water, the appliance according to the invention is equipped with a switching unit 10. The optimum mixture ratios of the powder fraction and water, the mixing times and the rates of addition of water and powder are preferably programmed permanently in the switching unit 10.

Another subject of the invention is a method for the production of water-based liquid paints by means of the dispersal of dispersion powder compositions in water, using this appliance.

The recipes for dispersion powder compositions for the production of water-based liquid paints are known to the average person skilled in the art and do not need to be explained in more detail here. In general, the compositions also contain, in addition to the dispersion powder fraction, pigments, for example titanium dioxide or inorganic or organic coloured pigments and fillers, such as calcites, dolomites or chalk. Compositions which also contain, in addition to the dispersion powder, other binders, such as lime, water glass and/or cement, are also suitable. It is also possible to produce liquid water-based paints by means of pulverulent binders, such as silicone resin powder, alone or in combination with dispersion powder.

The pulverulent constituents of the dispersion powder composition are introduced as a mixture into the filling funnel 9 and are conveyed continuously into the mixing container 5 by means of the conveying element 8. A low-speed rotor 8 having a rotational speed of 10 to 20 revolutions per minute has proved appropriate for conveyance. In order to prevent the pulverulent particles from sticking to the wall of the mixing container, preferably some of the water, generally one half to two thirds of the total water quantity in the recipe, is preferably fed by being supplied via the ring conduit 14. After the water has been fed, the dissolver 3 is lowered into the mixing container 5, and the dissolver 3 and the conveying element 8 are started. The rotational speed of the dissolver 3 is preferably 1,000 to 1,500 revolutions per minute.

The further dispersing operation, which involves the addition of residual water, powder conveyance and the duration of the mixing operation, if appropriate the variation of the conveying speed of the powder and the rotational speed of the dissolver, can be regulated automatically via the switching unit 10. In a preferred embodiment, the entire mixing operation is carried out by programme control, the optimum mixture ratios, mixing times, metering rates and dissolver speed being preprogrammed. The switching unit 10 terminates the dispersing operation automatically. After dispersal has ended, the finished liquid paint can be extracted at the extraction valve 11.

A new mixing operation should be started only after the mixing container 5 has been emptied completely. The filling level of the mixing container 5 may be ascertained, for example, by means of a built-in sensor and indicated by means of a LED display. In order to avoid accretions of paint during lengthy standing periods, in a further preferred embodiment the procedure may also be to meter in water automatically after the liquid paint thus obtained has been extracted completely, with the result that immediate flushing of the mixing container 5 is achieved. In this case, the control may be set in such a way that the operator can decide whether the metering-in of water is to serve merely for cleaning the mixing container 5 or is to be used as a preparation for a new mixing operation.

In the preferred embodiments of the method, manual actuation is restricted to the introduction of the pulverulent material and to the extraction of the ready-mixed liquid paint. The advantage of the appliance according to the invention is that it is now possible, on account of the travelling mixing appliance, to produce a liquid water-based dispersion paint from the powder constituents and water directly at the place of use, for example on the building site, the said dispersion paint being of the quality which it has hitherto been possible to obtain only by means of dissolvers installed at the factory. This appliance fully exploits the advantages of dispersion powders, as compared with aqueous binder dispersions: no transport of water; no stockkeeping in heated rooms to prevent the paint from freezing; easier disposal of the packaging material (bags instead of buckets or cans); no need for the addition of solvents or fungicides.

What is claimed is:

1. A mobile apparatus for the production of water-based liquid paints from pulverulent constituents and water, the apparatus comprising:

a) a traveling frame;

b) a mixing container supported on the frame, the mixing container comprising a cylindrical wall and a ring conduit extending circumferentially about an upper edge of the cylindrical wall of the mixing container, wherein the ring conduit has holes on its underside;

c) a mixing unit for mixing the pulverulent constituents and water, the mixing unit being supported on the frame, the mixing unit comprising a dissolver driven by a mixing motor, the mixing unit being capable of being lowered into the mixing container via a spring;

d) a metering unit for metering the pulverulent constituents into the mixing container, the metering unit comprising a metering container containing a conveying element for apportioning the pulverulent material into the mixing container, the metering unit further comprising a filling funnel and a metering motor for driving the conveying element; and e) a switching unit with control elements for controlling the metering and the mixing;

wherein the dissolver comprises a shaft and a dissolver disc, the ratio d/D of the diameter d of the dissolver disc to the diameter D of the mixing container being about 0.3 to 0.5, and the shaft being dimensioned in such a way that, during the mixing operation, the dissolver disc can be lowered to a distance h from the bottom of the mixing container of about 0.3 d to 0.7 d, d being the diameter of the dissolver disc.

2. The apparatus of claim 1 wherein the dissolver disc has teeth.

3. The apparatus of claim 1 wherein the metering container is mounted on an upper edge of the mixing container.

4. The apparatus of claim 3 wherein the metering container has an orifice for conveying pulverulent material from the metering container into the mixing container.

5. A method for the production of water-based liquid paints by means of the dispersal of dispersion powder compositions in water using an apparatus according to claim 1, wherein water is fed at least partially into the mixing container, the dispersion powder composition is introduced into tie filling funnel, the dispersion powder composition is then conveyed into the mixing container via the conveying element in the metering container, and the powder is dispersed in the water by means of the dissolver.

6. The method of claim 5 wherein the dissolver rotates at a speed of 1,000 to 1,500 revolutions per minute while the powder is being dispersed in the water.

7. The method of claim 5, wherein the dissolver disc has teeth.

8. The method of claim 5, wherein the metering container has an orifice for conveying pulverulent material from the metering container into the mixing container.

9. The method of claim 5 wherein the metering container has an orifice for conveying pulverulent material from the metering container into the mixing container.

10. The apparatus of claim 1 wherein D is between 200–400 mm.

11. The apparatus of claim 10 wherein the mixing container has a height H and the ratio of H/D is between 1:1 and 2:1.

* * * * *

UNITED STATES PATENT AND TRADEMARK OFFICE
CERTIFICATE OF CORRECTION

PATENT NO. : 6,290,386 B1 Page 1 of 1
DATED : September 18, 2001
INVENTOR(S) : Horst Baumgartl et al.

It is certified that error appears in the above-identified patent and that said Letters Patent is hereby corrected as shown below:

Column 5, claim 5,
Line 19, delete "tie" and insert -- the --.

Signed and Sealed this

Twelfth Day of March, 2002

Attest:

JAMES E. ROGAN
Attesting Officer  *Director of the United States Patent and Trademark Office*